May 2, 1961 B. J. VINCENT 2,982,364
APPARATUS FOR BORING FISHING HOLES IN ICE
Original Filed July 26, 1956
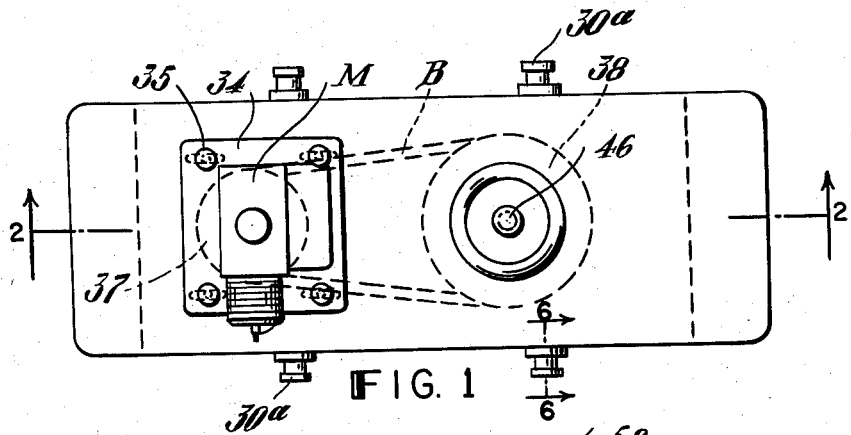
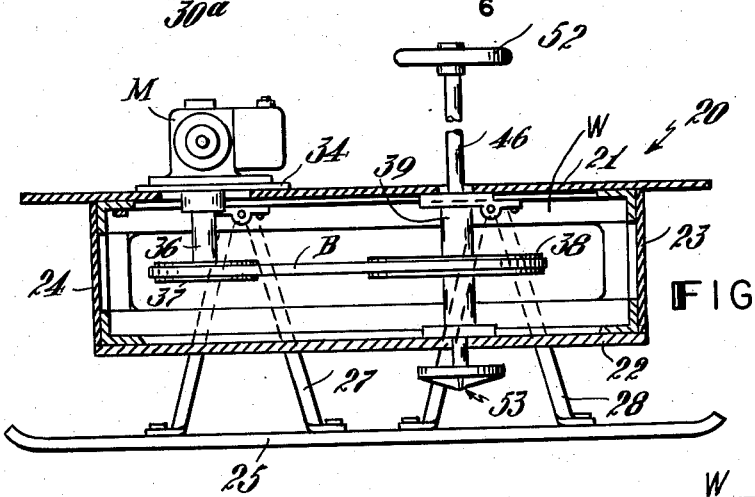
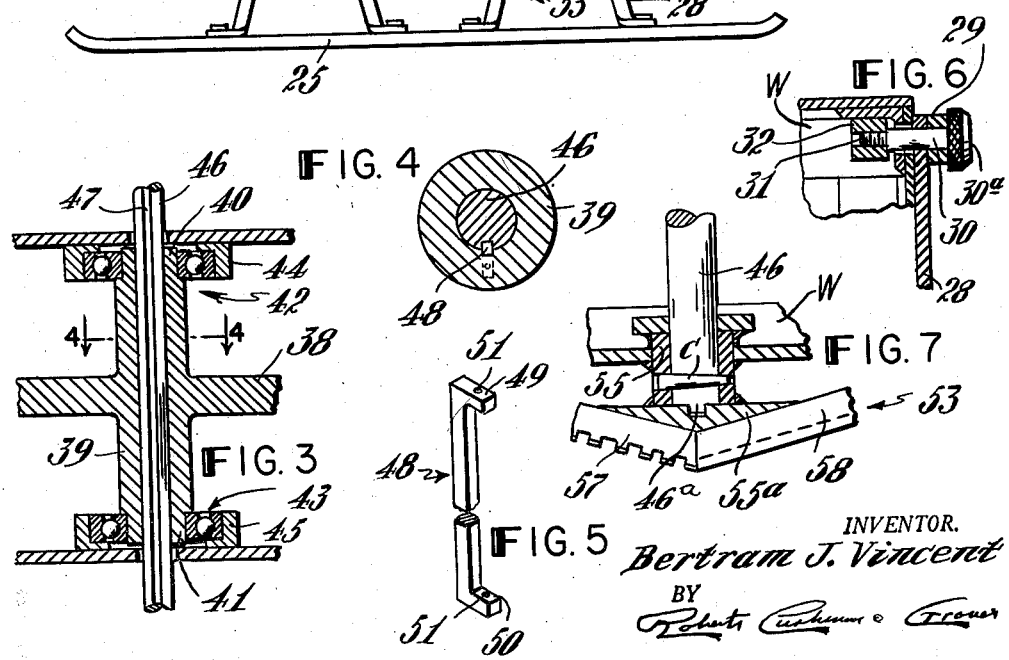
INVENTOR.
Bertram J. Vincent
BY
ATT'YS.

United States Patent Office 2,982,364
Patented May 2, 1961

2,982,364

APPARATUS FOR BORING FISHING HOLES IN ICE

Bertram J. Vincent, 115 Mechanic St., Leominster, Mass.

Original application July 26, 1956, Ser. No. 600,189, now Patent No. 2,860,855, dated Nov. 18, 1958. Divided and this application Aug. 27, 1958, Ser. No. 757,557

4 Claims. (Cl. 175—18)

This invention pertains to apparatus for use in ice fishing and more particularly to improved means for cutting fishing holes in ice, the present application being a division of the application filed by Bertram J. Vincent, Serial No. 600,189, on July 26, 1956, since issued as Patent No. 2,860,855 on November 18, 1958.

The primitive way of cutting ice fishing holes was by the use of an axe, but this method is laborious, time-consuming, and substantially impossible of performance when the ice is of substantial thickness. Ice cutting chisels have also been employed for the purpose, but though the chisel is superior to an axe, the hole made by the use of a chisel represents a great deal of wasted energy, and is usually much larger than is necessary or desirable. The use of an auger-like ice cutting tool has also been proposed, and tools of this type have been devised. Such tools represent an improvement, in theory at least, over the implements previously employed, but so far as is known to me, have not been generally adopted, possibly because as heretofore devised the design of the cutting edges employed has been such that the implement is not efficient, and further because such devices have usually been designed for manual operation.

The present invention has for an object the provision of apparatus for use in cutting ice-fishing holes, whereby holes of proper size may be cut without substantial waste of energy and through ice of any thickness such as may ordinarily be encountered on lakes or streams where fishing is customarily practiced. A further object is to provide ice cutting apparatus of readily portable type such as may be carried in the usual passenger automobile, but which, when set up for use, comprises supporting runners so that it may readily be pulled across ice or snow. A further object is to provide apparatus of the above type having an ice boring tool and motor means for driving it. Other and further objects and advantages of the invention will be pointed out in the following more detailed description and by reference to the accompanying drawings, wherein Fig. 1 is a plan view of a preferred form of apparatus embodying the invention;

Fig. 2 is a vertical section partly in elevation, substantially on the line 2—2 of Fig. 1;

Fig. 3 is a fragmentary diametrical section through the shaft of the boring tool, to larger scale than Fig. 2, and in substantially the same plane;

Fig. 4 is a section on line 4—4 of Fig. 3;

Fig. 5 is a perspective view of a desirable form of key which may be employed for connecting the drive pulley to the shaft;

Fig. 6 is a fragmentary section to larger scale on the line 6—6 of Fig. 1; and

Fig. 7 is a fragmentary radial section through a boring tool showing the means for detachably securing it to the lower end of the drill shaft.

Referring to Fig. 2 of the drawings, the numeral 20 designates the apparatus as a whole, this apparatus comprising, as here illustrated, a box-like housing comprising a horizontal top member or platform 21, a bottom 22, here shown as somewhat less in length than the top member, vertical end members 23 and 24, and side walls W, here shown as partially open to provide ready access to the interior chamber. This housing is mounted upon parallel runners 25 (only one of which is shown), each runner being provided with a pair of brackets 27 and 28, each of which comprises, as here illustrated, upwardly converging struts united at their upper ends (Fig. 6) to a sleeve member 29. Each sleeve member is designed to receive the body portion of a shoulder screw 30 having a screw-threaded shank 31, which, in use, has threaded engagement with a hole in a bracket 32 secured to the underside of the member 21. Each shoulder screw has an enlarged head portion 30a by means of which it may be turned manually, thereby making it readily possible to attach each of the runners to the super-structure to form a rigid sled but permitting the runners to be detached from the housing to facilitate the storage of the parts in the trunk of an ordinary passenger automobile.

A motor carriage 34 is mounted on the upper surface of the platform 21, here shown as just to the rear of the brackets 27, the motor carriage 34 having elongate slots designed to receive bolts 35 or the like, by means of which the motor carriage may be adjusted and held in adjusted position lengthwise of the platform 21, thereby to tension the drive belt hereafter described. A motor M, for instance a gasoline engine, is mounted on the carriage 34, and, by means of any suitable (preferably speed reducing) connections, drives a vertical shaft 36 extending down through an opening in the platform 21 and into the chamber between the top and bottom members 21 and 22, respectively. At its lower end the shaft 36 has fixed thereto a pulley 37.

A pulley 38, of larger diameter than the pulley 37, is arranged within the chamber between the members 21 and 22, its axis being parallel to that of the pulley 37, and a belt B embraces the two pulleys, whereby the pulley 38 is driven by the pulley 37 but at a lesser angular velocity. The pulley 38 is provided with a hub 39 (Fig. 3) having portions 40 and 41 of reduced diameter at its opposite ends, these portions 40 and 41 being received in the inner races of ball bearings 42 and 43, which respectively are secured, as by a press fit, in openings in parts 44 and 45 which are bolted to the top and bottom members 21 and 22 of the housing. A vertical shaft 46 extends through the bore of the pulley hub 39 and is splined to the latter as here illustrated. The shaft 46 has an elongate keyway 47 which receives a key 48 (Fig. 5), preferably provided at its upper and lower ends with offset portions 49 and 50 which seat in slots in the opposite ends of the hub 39 of the pulley. These offset portions 49 and 50 are provided with holes 51 to receive screws by means of which the key may be securely attached to the hub 39, so that the key cannot readily be lost. Obviously, if desired, other conventional means may be used for constraining the shaft to turn with the pulley while permitting relative axial motion of the shaft and pulley.

The inner race of a ball bearing is attached by a press fit to the upper end of the shaft 46, while the outer race of this ball bearing is secured to a hand wheel 52 which is thus capable of turning, freely relatively to the shaft 46, but which forms a convenient handle by means of which the shaft may be moved vertically relatively to the hub 39 of the pulley 38.

At its lower end, the shaft is connected to an ice boring tool 53 (Figs. 2 and 7) of any suitable type, although preferably of the construction more specifically disclosed in the above co-pending application of which this is a division. As shown in Fig. 7, this boring tool comprises a rigid sleeve member 55 having an axial bore in which the lower end of the shaft 46 fits. A taper pin C is here shown as removably securing the sleeve 55 to the shaft 46, although other conventional means, for example an ordinary cotter pin, may be employed for the purpose. In order to insure proper driving of the boring tool by the shaft 46 without interfering with the ready removal of the tool from the shaft, a suitable key and slot connection is provided, as, for example, comprising the key element 46a at the lower end of the shaft, which engages a slot in a mass 55a of welding metal which unites the lower end of the sleeve 55 to the ice cutting blades 57 and 58.

In operation, the sled is moved to the place where the hole is to be cut, and then, after starting the motor, the operator, standing upon the platform 21 so that his weight assists in keeping the sled stationary, seizes the hand wheel 52 and pushes the shaft 46 downwardly, thus bringing the point of the boring tool into contact with the ice. As the tool revolves, it rapidly drills a hole into the ice, its downward motion being assisted, if desired, by the application of downward pressure to the hand wheel 52. After the hole has reached a certain depth, the tool may be withdrawn from the hole by lifting up on the hand wheel 52, thus raising the tool above the ice, but to a position below the bottom member 22 of the sled. In this position, the continued rotation of the tool empties the tool of ice chips by centrifugal action, the bottom 22 of the housing acting as a guard to prevent these chips from being thrown onto the belt or pulley. The tool is then moved downwardly again into the partially formed hole and the operation repeated until the hole extends all of the way through the ice, the shaft 46 being of a length such that the cutter may be moved down through the entire thickness of the ice, which may be three feet or more, while the hand wheel 52 is still in convenient position for actuation by the operator. The tool is then retracted completely and the sled moved to another position, where another hole may may be drilled in the same way.

When the apparatus is to be transported from place to place, the boring tool is disconnected from the lower end of the drill shaft 46, and the latter is pulled up out of the bore in the pulley hub 39 and completely withdrawn, and the screws 30a are backed off so as to detach the runner brackets from the platform 21. Thus the boring tool, the drill shaft, and the runners with their brackets are all separated from the housing, thus making it possible to store all of the constituent elements of the apparatus in the trunk of an ordinary passenger automobile.

While one desirable embodiment of the invention has been disclosed herein by way of example, it is to be understood that the invention is broadly inclusive of any and all modifications falling within the scope of the appended claims.

I claim:

1. Apparatus for use in boring fishing holes in ice, said apparatus comprising a housing including a horizontal top or platform, a bottom and end members thereby defining an interior chamber, a motor carriage bolted to the platform, a vertical shaft which is driven by the motor and which extends downwardly through a hole in the platform into said chamber, a pulley fixed to said shaft, the platform and bottom member having aligned holes whose axes are spaced horizontally from the axis of the motor driven shaft, bearings fixed to the platform and to the bottom member, respectively, coaxial with the holes therein, a pulley of a diameter exceeding that of the motor driven pulley having a hub whose opposite end portions turn in the respective bearings, said hub having an axial bore, a vertical drill-shaft extending through the bore in the pulley hub and which is of a length to extend above the platform and below the bottom member of the housing, means constraining said drill-shaft to turn with the pulley hub while permitting the shaft to move axially relative to the hub, an endless belt embracing said pulleys, an ice boring tool which is normally fixed to the lower end of said drill-shaft, and means secured to the upper end of the drill-shaft whereby the latter may be moved up or down.

2. Apparatus, according to claim 1, further characterized in having a pair of sled runners for supporting the housing, each runner being provided with a pair of spaced upstanding rigid brackets, the brackets of the respective runners being located at opposite sides of the housing, and means detachably securing each bracket to the top member of the housing.

3. Apparatus, according to claim 1, further characterized in that the boring tool is detachably secured to the lower end of the drill-shaft, and the drill-shaft is so connected to the driving pulley that the shaft may be pulled out of the bore in the hub of the driving pulley after the boring tool has been disconnected from the shaft.

4. Apparatus for boring fishing holes in ice comprising an elongate, substantially horizontal rigid platform on which the operator may stand; means for supporting the platform in an elevated position above the surface of the ice, the platform having two holes therethrough, spaced apart longitudinally of the platform, a vertical drive shaft extending down through one of said holes and a vertical drill shaft extending down through the other of said holes, a motor, supported by the platform, for turning the drive shaft; means for transmitting motion from the drive shaft to the drill shaft, said motion-transmitting means being located wholly below the platform thereby providing an unobstructed area of the upper surface of the platform upon which the operator may stand without danger of contacting the motion-transmitting means, the motion-transmitting means including a pulley fixed to the drive shaft below the platform, a drill shaft pulley, of a diameter exceeding that of the pulley on the drive shaft and which is also below the platform, the drill-shaft pulley having an elongate tubular hub whose axis is parallel to that of the drive shaft vertically spaced bearings below the platform for the opposite ends, respectively, of the hub of the drill shaft pulley; an endless belt embracing the pulleys, means constraining the drill shaft to turn with the pulley hub while permitting the drill shaft to move axially relatively to the hub; an ice boring tool, and means releasibly securing it to the lower end of the drill shaft; a hand wheel rotatably secured to the upper end of the drill shaft above the platform, the drill shaft being of a length such that when the boring tool is in operative engagement with the ice, the hand wheel is within reach of an operator standing upon the platform, the hand wheel providing means whereby the drill shaft and ice boring tool may be moved up and down by the operator standing on the platform and while the drill shaft is being rotated by the motor, and means, located below the belt and pulleys, operative to protect them from ice chips thrown upwardly by the ice boring tool when in operation.

References Cited in the file of this patent

UNITED STATES PATENTS

| | | |
|---|---|---|
| 1,465,463 | DeLotto | Apr. 21, 1923 |
| 1,526,165 | McKee | Feb. 10, 1925 |
| 2,061,218 | Watson | Nov. 17, 1936 |
| 2,692,757 | Folstad | Oct. 26, 1954 |
| 2,742,750 | Funk | Apr. 24, 1956 |